(12) United States Patent
Stemmer et al.

(10) Patent No.: US 11,031,005 B2
(45) Date of Patent: Jun. 8, 2021

(54) CONTINUOUS TOPIC DETECTION AND ADAPTION IN AUDIO ENVIRONMENTS

(71) Applicant: Intel Corporation, Santa Clara, CA (US)

(72) Inventors: Georg Stemmer, Munich BY (DE); Andrzej Mialkowski, Pomorskie (PL); Joachim Hofer, Munich BY (DE); Piotr Rozen, Gdansk PM (PL); Tomasz Szmelczynski, Gdansk (PL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/223,078

(22) Filed: Dec. 17, 2018

(65) Prior Publication Data

US 2019/0147875 A1    May 16, 2019

(51) Int. Cl.

| | | |
|---|---|---|
| *G10L 15/22* | (2006.01) | |
| *G10L 15/18* | (2013.01) | |
| *G10L 15/30* | (2013.01) | |
| *G06F 3/16* | (2006.01) | |
| *G10L 15/08* | (2006.01) | |
| *G10L 15/183* | (2013.01) | |

(52) U.S. Cl.
CPC .............. *G10L 15/22* (2013.01); *G06F 3/167* (2013.01); *G10L 15/1815* (2013.01); *G10L 15/30* (2013.01); *G10L 15/183* (2013.01); *G10L 2015/088* (2013.01); *G10L 2015/223* (2013.01)

(58) Field of Classification Search
CPC ..... G10L 15/22; G10L 15/30; G10L 15/1815; G10L 15/183; G10L 2015/223; G10L 2015/088; G10L 15/187; G10L 2015/183; G10L 2015/225; G06F 3/167
See application file for complete search history.

(56) References Cited

U.S. PATENT DOCUMENTS

| | | | |
|---|---|---|---|
| 2005/0021331 A1* | 1/2005 | Huang | ................. G10L 15/1815 704/231 |
| 2014/0214429 A1* | 7/2014 | Pantel | ..................... G10L 15/32 704/275 |
| 2014/0278435 A1* | 9/2014 | Ganong, III | ............ G10L 15/22 704/275 |
| 2017/0372698 A1* | 12/2017 | Kerr | ........................ G10L 15/28 |

\* cited by examiner

Primary Examiner — Yogeshkumar Patel
(74) Attorney, Agent, or Firm — Jaffery Watson Mendonsa & Hamilton LLP

(57) ABSTRACT

A mechanism is described for facilitating continuous topic detection and adaption in audio environments, according to one embodiment. A method of embodiments, as described herein, includes detecting a term relating to a topic in an audio input received from one or more microphones of the computing device including a voice-enabled device; analyzing the term based on the topic to determine an action to be performed by the computing device; and triggering an event to facilitate the computing device to perform the action consistent with the term and the topic.

14 Claims, 7 Drawing Sheets

CONTINUOUS TOPIC DETECTION AND ADAPTION IN AUDIO ENVIRONMENTS

FIELD

Embodiments described herein relate generally to data processing and more particularly to facilitate continuous topic detection and adaption in audio environments.

BACKGROUND

Conventional systems are based on techniques like keyphrase detection, wakeup phrase detection, wake-on-voice, etc. Such conventional system-based audio devices are severely limited in that they are entirely dependent upon recognizing a small number of keyphrases and thus such devices are triggered only when one of the keyphrases is recognized by the device.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
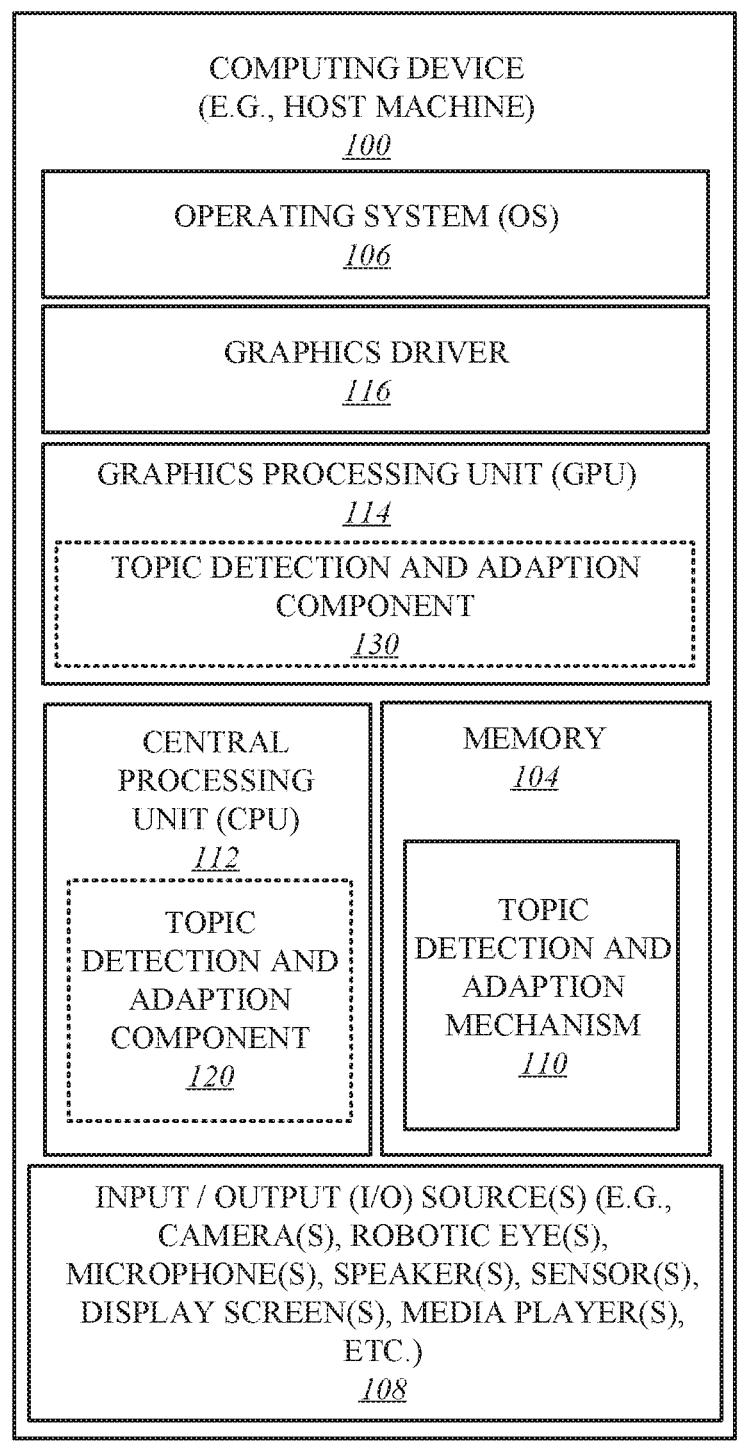
FIG. 1 illustrates a computing device employing a topic detection and adaption mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel always-listening topic detection technique ("topic detection technique") capable of being employed at a voice-enabled device such that the novel technique runs and functions continuously even when the voice-enabled device hibernates in a low-power state. In one embodiment, topic detection technique may be employed at a voice-enabled device as software, hardware, or any a combination thereof, such as firmware, and used in detecting words or phrases from a pre-defined list of such words or phrases.

In one embodiment, a set of words and/or phrases matching varying topics may be put together regardless the position at which they are uttered in conversation. For example, in some embodiments, a voice-enabled device wakes up when one or more users/speakers talk about sports by, for example, mentioning words and/or phrases like "goal", "soccer", "world cup", "winning team", "world champions", etc. Embodiments further provide for a novel technique to avoid misrecognitions, such as due to the limited number of words/phrases in the set, by offering an automatic adaptation capability that leverages a component that starts only when the voice-enabled device is in a high-power state.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent".

For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a topic detection and adaption mechanism ("topic mechanism") 110 according to one embodiment. Computing device 100 represents a communication and data processing device including or representing (without limitations) a voice-enabled device (VED), a voice command device (VCD), and/or the like. Computing device 100 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip.

Throughout this document, computing device 100 may be interchangeably referred to as "smart voice device" or "smart voice-enabled device" or "voice-enabled device" or "VED" or "voice command device" or "VCD", or simply "voice device" that includes or works with or is embedded in or facilitates any number and type of smart devices, such as (without limitation) smart command devices or intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

As illustrated, in one embodiment, voice-enabled device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 104, network devices, drivers, or the like, as well as input/output (I/O) source(s) 108, such as touchscreens, touch panels, touch pads, virtual or regular keyboards, virtual or regular mice, ports, connectors, etc. Voice-enabled device 100 may include operating system (OS) 106 serving as an interface between hardware and/or physical resources of voice-enabled device 100 and a user.

It is to be appreciated that a lesser or more equipped system than the example described above may be preferred for certain implementations. Therefore, the configuration of voice-enabled device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, as illustrated, topic mechanism 110 may be hosted by memory 104 in communication with I/O source(s) 108, such as microphones, speakers, etc., of voice-enabled device 100. In another embodiment, topic mechanism 110 may be part of or hosted by operating system 106. In yet another embodiment, topic mechanism 110 may be hosted or facilitated by graphics driver 116. In yet another embodiment, topic mechanism 110 may be hosted by or part of graphics processing unit ("GPU" or simply graphics processor") 114 or firmware of graphics processor 114; for example, topic mechanism 110 may be embedded in or implemented as part of the processing hardware of graphics processor 114, such as in the form of topic detection and adaption component ("topic component") 120. Similarly, in yet another embodiment, topic mechanism 110 may be hosted by or part of central processing unit ("CPU" or simply "application processor") 112; for example, topic mechanism 110 may be embedded in or implemented as part of the processing hardware of application processor 112, such as in the form of topic component 130.

One embodiment of the architectural placement and hosting of the various elements of topic mechanism 110 and/or one or more of topic components 120, 130 is further illustrated and described later in this document with reference to FIG. 3A. However, it is contemplated and to be noted that embodiments are not limited to voice-enabled device 100 or/or any particular system or manner to placement or hosting of any of the elements of topic mechanism 110 and/or one or more of topic components 120, 130.

It is contemplated that this novel technique is limited to a software implementation or a hardware implementation and, as will be further described in this document, this novel technique may be applied and implemented in software, hardware, or any combination thereof, such as firmware. It is contemplated that embodiments are not limited to certain implementation or hosting of topic mechanism 110 and that one or more portions or components of topic mechanism 110 may be employed or implemented as hardware, software, or any combination thereof, such as firmware.

Voice-enabled device 100 may host network interface device(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
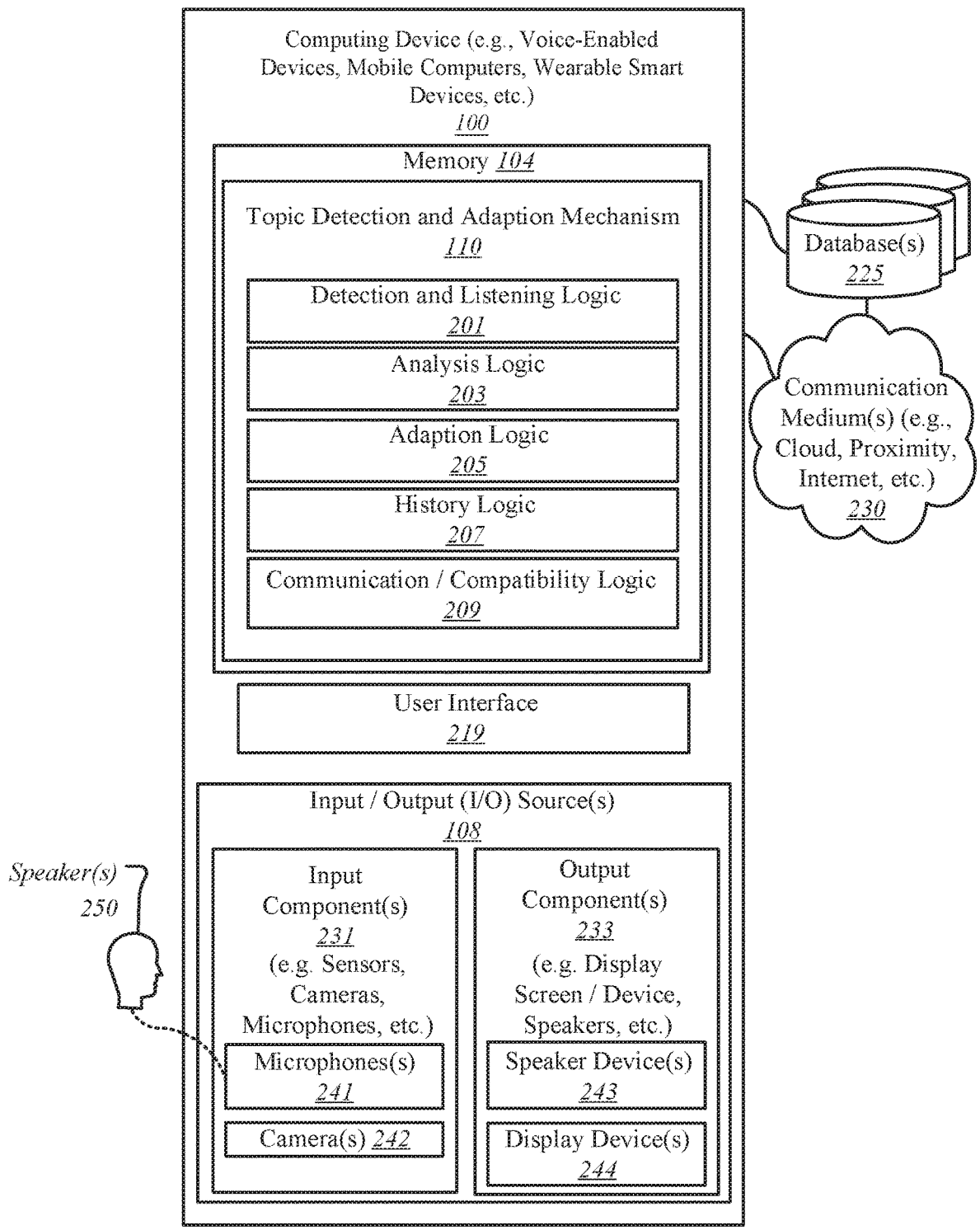
FIG. 2 illustrates a topic detection and adaption mechanism according to one embodiment.

FIG. 2 illustrates topic detection and adaption mechanism 110 of FIG. 1 according to one embodiment. For brevity, many of the details already discussed with reference to FIG. 1 are not repeated or discussed hereafter. In one embodiment, voice-enabled device 100 employs topic mechanism 110 and/or one or more of topic components 120, 130 of FIG. 1. As illustrated, in one embodiment, topic mechanism 110 may include any number and type of components, such as (without limitations): topic detection logic 201; analysis logic 203; adaption logic 205; history logic 207; and communication/compatibility logic 209.

Voice-enabled device 100 is further shown to include user interface 219 (e.g., graphical user interface (GUI)-based user interface, Web browser, cloud-based platform user interface, software application-based user interface, other user or application programming interfaces (APIs), etc.). Voice-enabled device 100 may further include I/O source(s) 108 having input component(s) 231, such as camera(s) 242 (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s), etc.

Voice-enabled device 100 is further illustrated as having access to and/or being in communication with one or more database(s) 225 and/or one or more of other computing devices over one or more communication medium(s) 230 (e.g., networks such as a proximity network, a cloud network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, voice-enabled device 100 may host I/O source(s) 108 including input component(s) 231 and output component(s) 233. In one embodiment, input component(s) 231 may include a sensor array including, but not limited to, microphone(s) 241 (e.g., ultrasound microphones), camera(s) 242 (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", "element", and "mechanism" may include, by way of example, software or hardware and/or a combination thereof, such as firmware. For example, logic may itself be or include or be associated with circuitry at one or more devices, such as topic detection component 130 and/or topic detection component 120 hosted by application processor 112 and/or graphics processor 114, respectively, of FIG. 1 having to facilitate or execute the corresponding logic to perform certain tasks.

For example, as illustrated, input component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into voice-enabled device 100 and converting this audio or sound into electrical signals. Similarly, it is contemplated that one or more of camera(s) 242 serve as one or more input devices for detecting and capturing of image and/or videos of scenes, objects, etc., and provide the captured data as video inputs into voice-enabled device 100.

To avoid any potential confusion between terms, it is contemplated and to be noted that "speaker(s)" 250 refers to user(s) or individual(s) or human(s) who speak into voice-enabled device 100 using their voices or sounds, like words, phrases, sentences, etc., while "speakers" or "speaker device (s)" 243 are part of output component(s) 233 and refer to one or more output device(s) coupled to or embedded into voice-enabled device 100 to convert electric signals into sound.

As described above, certain words or phrases, such as wake-on-voice or key phrase recognizer, includes well-defined and optimal input signal levels for which high recognition rates are used and thus the closer to the optimal level, better the results of the words and phrases. However, any hand signals that are used as inputs, such as through one or more camera(s) 242, may vary based on the type of devices, platforms, operation systems, etc. For example, on certain operation systems, these optimal levels can be affected by microphone gains and boost settings when such optimal levels are controlled or provided by users. Stated differently, signal levels can be user-specific and can easily shift in optimal values.

Further, in some cases, mute settings may not be applied to the microphone signals, which can lead to a situation when, for example, voice-enabled device 100 is awaken by a spoken word even when microphone(s) 241 or other internal listening components may seem shut from the perspective of speaker 250. Typically, microphone gain and boost levels are set early during the tune stage; however, these levels can be modified based on any gain and boost changes made by a user, such as speaker 250, or a software application running on voice-enabled device 100, such as Skype® application with automatic gain control, etc., during the lifetime of voice-enabled device 100.

As mentioned earlier, conventional systems depend on techniques like keyphrase detection, wakeup phrase detection, wake-on-voice detection, etc., where a keyphrase (e.g., "OK Google", "Hello Alexa", etc.) are required to be spoken by a speaker and recognized by a conventional system for the system to be triggered and get going. Consequently, conventional systems are rather limited in their approach and uses and lose out on much of their technological abilities due to such limitations.

Conventional techniques require the user to remember and pronounce a fixed keyphrase in order to wake up a conventional technique-based device. If the user forgets or cannot sufficiently pronounce the keyphrase, it leaves their device practically useless. Further, using conventional techniques, any particular keyphrase can only work with a particular system or device, such as speaking "Hey Alexa" automatically decides for the user which device, such as Alexa®, should respond. Moreover, using conventional techniques, a device is not capable of taking an initiative, such as offer to help when a person having a discussion with another person.

Embodiments provide for a novel technique, as facilitated by topic mechanism 110 and/or one or more of topic components 120, 130, for always-listening title detection by voice-enabled devices, such as voice-enabled device 100 (e.g., smartphones, tablet computers, smart home appliances, computers, etc.), such that the technique deals with spoken user interfaces, such as user interface 219, used with one or more I/O source(s) 108 like microphone(s) 241 for users, such as speaker 250, to speak into and speaker device(s) 243 to utter sounds, noise, etc., which can be heard by users, such as speaker 250.

Embodiments further provide for a novel technique, as facilitated by topic mechanism 110 and/or one or more of topic components 120, 130, to automatically wakeup voice-enabled device 100 as initiated by a man-machine interaction, such as when speaker 250 mentions a specific topic in a conversation as captured by microphone(s) 241. Embodiments also provide for a novel technique, as facilitated by topic mechanism 110 and/or one or more of topic components 120, 130, where voice-enabled device 100 responds, automatically, directly, and adequately, to topic-based conversations or requests like "I am starving" such that speaker 250 can have a free-flowing conversation without having to memorize any keyphrases or wakeup phrases.

It is contemplated that to save power, most computing devices are maintained in low-power state, such as when they are not being used. In one embodiment, detection and listening logic 201 may be used to detect any input of words or phrases spoken or uttered by a user, such as speaker 250, such as one or more words or phrases from a set of words/phrases relating to different titles. In one embodiment, this set of words/phrases may be established based on historical information as obtained from a history buffer associated with database(s) 225.

As facilitated by detection and listening logic 201, in one embodiment, any spoken user input may be regarded as sufficient to wake up voice-enabled device 100, such as to switch voice-enabled device 100 from low-power state into a high-power state, while getting it ready for more comprehensive interaction with speaker 250 and other speakers and/or voice-enabled devices over one or more communication medium(s) 230.

For example, detection and listening logic 201 may be used to listens to or receives any incoming audio streams from one or more microphone(s) and then detect any words or phrases from a pre-defined set of words and phrases (also collectively referred to as "set of terms") relating to or defining one or more topics of conversions, such as words or phrases like (but not limited to) "soccer" or "team A could have won the world cup" suggest the topic is likely to be "sports". Alternatively, for example, if the topic is "fitness/workout", the set of terms may include words or phrases like (but not limited to) "biking speed", "cancel my workout", "average power", etc.

In one embodiment, detection and listening logic 201 may be kept turned-on to be continuously listening and detecting to words and phrases associated with the predefined set of terms. When, however, detection and listening logic 201 is running on a resource-constrained processor (such as on a digital signal processor (DSP) subsystem), detection and listening logic 201 may stay active even when in low-power state, but without having to use or consume any additional memory, compute, or power resources. For example, for additional power reduction, detection and listening logic 201 may be launched merely when speech has already been detected by microphone(s) 241 as part of the incoming audio. Further, detection and listening logic 201 may include an understanding component that, in working with analysis logic 203, post-processes the output of detection and listening logic 201 to decide whether to trigger an event "topic detected" that can then, in turn, wakeup voice-enabled device 100.

In another embodiment, as will be further described in this document, detection and listening logic 201 may also be used to keep a hardware and/or software listening component, such as microphone(s) 241, at voice-enabled device 100 continuously on and listening, such as even when voice-enabled device 100 is running in low-power state. Stated differently, detection and listening logic 201 does not necessitate voice-enabled device 100 additional memory, compute, or power resources to have its microphone(s) 241 listening to spoken inputs and analysis logic 203 to analyze and distinguish between varying types of such inputs.

Embodiments provide for a novel technique, as facilitated by analysis logic 203, to reliably distinguish between multiple types of spoken inputs using limited compute and memory resources that are already available in the low-power state. For example, analysis logic 203 works with detection and listening logic 201 to distinguish between a spoken input that is to be ignored as opposed to another spoken input that is regarded as meaningful and is used to trigger an event that switches voice-enabled device 100 into high-power state through its listening component, such as one or more of microphone(s) 241.

Further, in one embodiment, analysis logic 203 is invoked when detection and listening logic 201 has triggered a "topic detected" even, resulting in the potential awakening of voice-enabled device 100, where analysis logic 203 then receives contents of a history buffer. In one embodiment, analysis logic 203 performs a more thorough speech recognition analysis of the word or phrases spoken by speaker 250 in light of the contents of the history buffer, which can leverage more memory and compute available during the active state of voice-enabled device 100. Subsequently, based on the results and findings of analysis logic, action is triggered at voice-enabled device 100, while voice-enabled device 100 is put back into low-power state.

In some embodiments, a history buffer may contain one or more predefined sets of terms along with any other historical and/or pertinent information or metadata associated with each of the words or phrases contained in one or more sets of terms, as generated by adaptation logic 205 and provided access to by history logic 207. For example, as newer words or phrases are spoken, such words and/or phrases may be added to one or more sets; alternatively, over time, certain words and/or phrases may be removed from the sets. Such modification may be triggered due to any number of reasons, such as: 1) when directly requested by users, such as speaker 250; 2) based on habits of speaking or not speaking of words/phrases by certain speakers; 3) addition or deletion of words/phrases to and from dictionaries; 4) changes in cultural trends; and/or the like. As further discussed later in the document, adaptation logic 205 may be invoked to generate and modify one or more predefined sets, while history logic 207 facilitates maintenance of and access to these sets of terms and any relevant metadata that is stored using one or more history buffers, where these terms and/or metadata are then readily available for analysis logic 203 to analyze any detected words and/or phrases for further processing. In some embodiment, history buffer may be stored, maintained, and facilitated by database(s) 225, as facilitated by history logic 207.

For example, as facilitated by history logic 207, a history buffer to facilitate storing of a history of potentially relevant conversations, such as those of the last 30 seconds of the input speech signal. In some embodiments, this history buffer may be used to enable a deeper analysis of the spoken input by analysis logic 203, such as when voice-enabled device 100 has been switched from low-power state to high-power state. Further, in order to save memory, a history buffer may not store actual audio samples; rather, it stores a transformed version of them, such as Mel-spectral feature coefficients, as facilitated by history logic 207.

As discussed earlier, in one embodiment, adaptation logic 205 is invoked to use the results from the analysis logic 203 and, optionally, any other information or metadata from other sources, such as from one or more sensors (e.g., camera(s) 242, microphone(s) 241, other sensors) of I/O source(s) 108, database(s) 225, one or more cloud services over communication medium(s) 230. Such results may be used by adaptation logic 205 to dynamically update, if necessitated, the predefined set of terms in communication with detection and listening logic 201, as described earlier. For example, if a topic-detected event has been triggered by detection and listening logic 201 for the topic of fitness/workout and, for example, the output obtained from analysis logic 203 contains the phrase "heart rate", then this phrase may be added to the set of terms for current and future users.

For example, if speaker 250 manually enters a location of a gymnasium to, for example, a navigation system of their vehicle, then adaptation logic 205 may automatically add the name of that gymnasium to the set of terms, while using any available cloud service to learn additional details about the location, such as hours of operations, prices, deals, physical address, distance from home, etc.

It is contemplated that embodiments are not limited to any number or type of microphone(s) 241, camera(s) 242, speaker(s) 243, display(s) 244, etc. For example, as facilitated by detection and listening logic 201, one or more of microphone(s) 241 may be used to detect speech or sound simultaneously from users, such as speakers. Similarly, as facilitated by detection and listening logic 201, one or more of camera(s) 242 may be used to capture images or videos of a geographic location (whether that be indoors or outdoors) and its associated contents (e.g., furniture, electronic devices, humans, animals, trees, mountains, etc.) and form a set of images or video streams.

Similarly, as illustrated, output component(s) 233 may include any number and type of speaker(s) or speaker device(s) 243 to serve as output devices for outputting or giving out audio from voice-enabled device 100 for any number or type of reasons, such as human hearing or consumption. For example, speaker(s) 243 work the opposite of microphone(s) 241 where speaker(s) 243 convert electric signals into sound.

Further, input component(s) 231 may further include any number and type of cameras, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinema-graphs, etc. Similarly, for example, displays may include any number and type of displays, such as integral displays, tensor displays, stereoscopic displays, etc., including (but not limited to) embedded or connected display screens, display devices, projectors, etc.

Input component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 231 may further include one or more of supporting or supplemental devices for capturing and/or sensing of data, such as illuminators (e.g., IR illuminator), light fixtures, generators, sound blockers, etc.

It is further contemplated that in one embodiment, input component(s) 231 may further include any number and type of context sensors (e.g., linear accelerometer) for sensing or detecting any number and type of contexts (e.g., estimating horizon, linear acceleration, etc., relating to a mobile computing device, etc.). For example, input component(s) 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); and gravity gradiometers to study and measure variations in gravitation acceleration due to gravity, etc.

Further, for example, input component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as voice-enabled device 100, and may be referenced interchangeably with "person", "individual", "human", "him", "her", "child", "adult", "viewer", "player", "gamer", "developer", programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that works with one or more of an operating system, a graphics driver, etc., of a computing device, such as voice-enabled device 100. In another example, "logic" may refer to or include a hardware component that is capable of being physically installed along with or as part of one or more system hardware elements, such as an application processor, a graphics processor, etc., of a computing device, such as voice-enabled device 100. In yet another embodiment, "logic" may refer to or include a firmware component that is capable of being part of system firmware, such as firmware of an application processor or a graphics processor, etc., of a computing device, such as voice-enabled device 100.

Further, any use of a particular brand, word, term, phrase, name, and/or acronym, such as "neuron", "neural network", "deep neural network", "recurrent deep neural network", "functions", "factors", "depth", "pixel depth", "velocity", "class", "optical flow", "supervised motion", "odometry", "machine learning interface", "machine learning model", "neural network", "creating", "training", "inferencing", "classifying", "scoring", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from topic mechanism 110 and/or one or more of topic components 120, 130 of FIG. 1 to facilitate various embodiments including adding, removing, and/or enhancing certain features. For brevity, clarity, and ease of understanding of topic mechanism 110, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

Figure 3A:
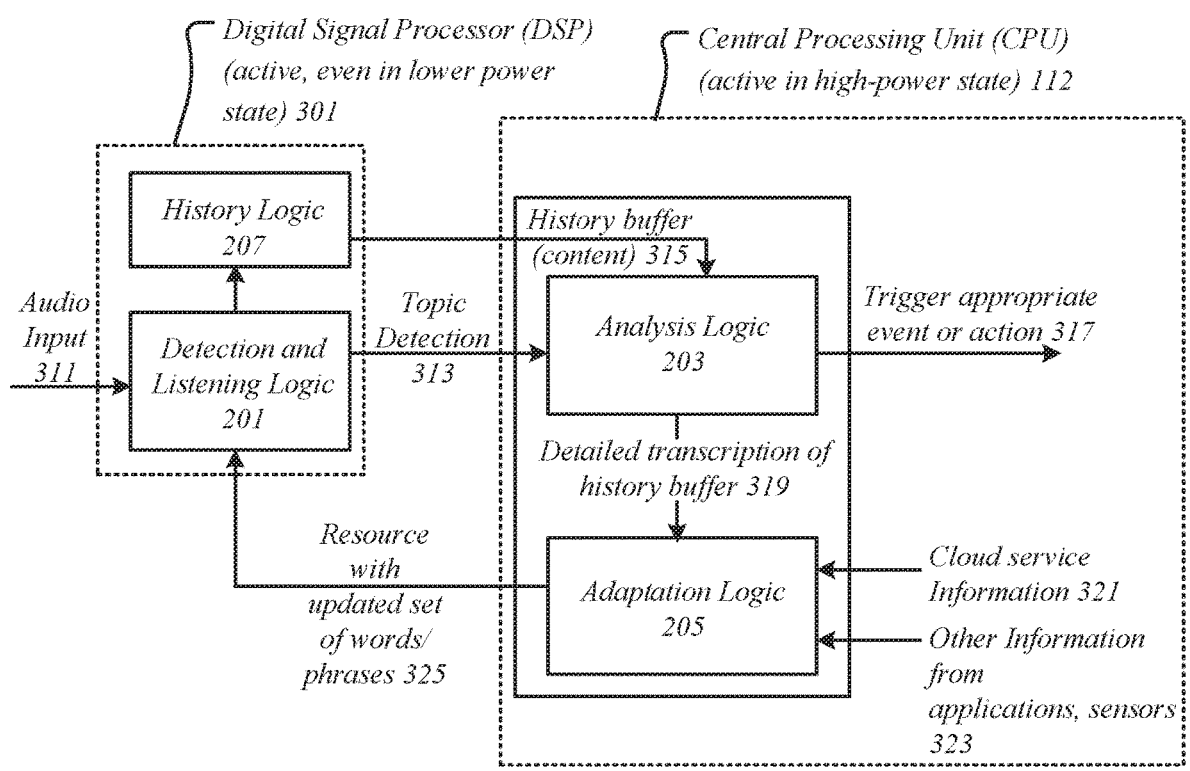
FIG. 3A illustrates an architectural placement according to one embodiment.

FIG. 3A illustrates an architectural placement 300 according to one embodiment. For the sake of brevity, many of the details previously mentioned or discussed with reference to FIGS. 1-2 may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by topic mechanism 110 and/or one or more of topic components 120, 130 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

As an initial matter, it is contemplated and to be noted that embodiments are not limited to any particular architectural system or placement of elements, just as elements are not limited to that of hardware, software, or any combination thereof. For example, embodiments are not limited to the illustrated architectural placement 300, which is illustrated here as one embodiment for brevity, clarify, and ease of understanding.

In the illustrated embodiment, DSP 301 and CPU 112 of a voice-enabled device, such as voice-enabled device 100 of FIG. 1, are shown as employing one or more components of topic mechanism 110 and/or one or more of topic components 120, 130 of FIG. 1. As illustrated, DSP 301 is shown as hosting detection and listening logic 201 and history logic 207, while CPU 112 is shown as hosting analysis logic 203 and adaptation logic 205.

As further illustrated, audio input 311 (e.g., word, phrase, etc.) is received by detection and listening logic 201 as detected by one or more microphones of the voice-enabled device. In one embodiment, dependent on the audio input 311, topic detection 313 is sensed by detection and listening logic 201, such as when audio input 311 incudes a word or a phrase that is part of a predetermined set of terms as generated by adaptation logic 205 at CPU 112. For example, detection and listening logic 201 is provided access to any resources with the update set of terms 325 as generated and offered by adaption logic 205. Further, as illustrated, in one embodiment, adaptation logic 205 pertinent information through cloud service 321 and other applications, sensors 323 that can then be used to generate one or more predetermined lists of terms by adaption logic 205.

In one embodiment, topic detection 313 is communicated from detection and listening logic 201 to analysis logic 203, along with any pertinent information, such as access to history buffer 315, is offered from history logic 207 to analysis logic 203, where analysis logic 203 then triggers an appropriate event or action 317 based on topic detection 313 and any contents of history buffer 315. Further, detailed transcription of history buffer 319 is communicated from analysis logic 203 to adaption logic 205.

Figure 3B:
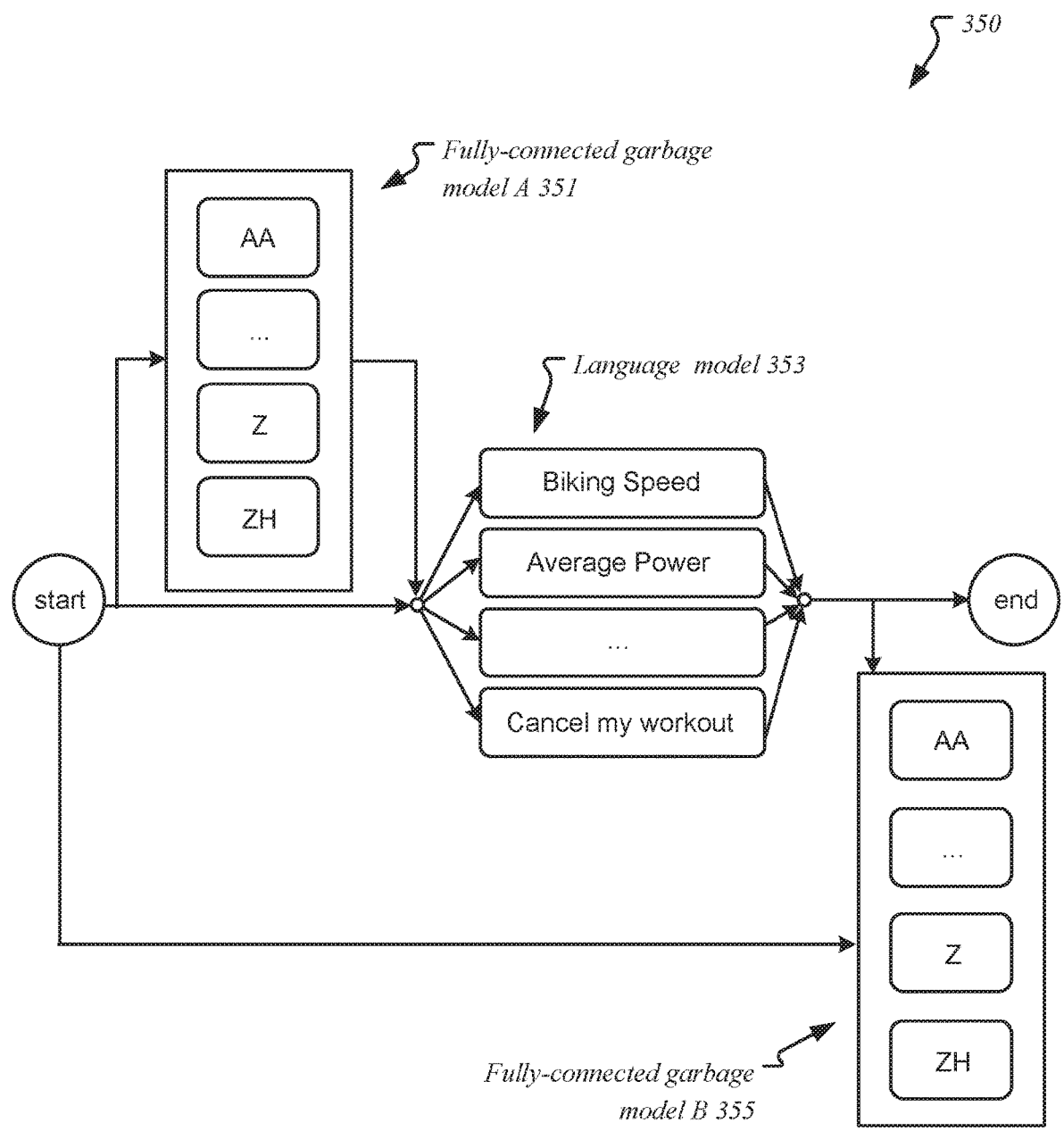
FIG. 3B illustrates a use case scenario according to one embodiment.

FIG. 3B illustrates a use case scenario 350 according to one embodiment. For the sake of brevity, many of the details previously mentioned or discussed with reference to FIGS. 1-3A may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by topic mechanism 110 and/or one or more of topic components 120, 130 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

For example, as previously discussed, detection and listening logic 201 of FIG. 2 may be based on a state-of-the-art embedded speech recognition engine using a special language model, such as language model 353, as illustrated in this use case scenario 350. In one embodiment, language model 353 contains a list of predefined terms (such as "biking speed", "average power", "cancel my workout", etc.) and combine such terms (e.g., works, phrases, etc.) with one or more garbage models, such as fully-connected garbage model 351, 355, to cover all other words and phrases that may not be part of language model 353. In one embodiment, garbage model 351, 355 may be implemented using a number of techniques, such as using fully-connected phone models (e.g., "AA", "Z", "ZH", etc.).

In order to provide more information about feasibility and usefulness of this novel technique, this illustrated use case scenario 350 uses and describes results and approximate power estimations based on a set of utterances recorded from users of a wearable device, such as a smartphone, smart watches, etc., in the fitness domain. A wearable fitness tracker, such as offered through a smart watch, detects and answers to spontaneous spoken requests, such as "how many sprints are in the run?", "how many kilometers is today's workout?", "I want to do my planned run", etc.

For this use case scenario 350, detection and listening logic 201 of FIG. 2 may use a predefined set of terms, such as 398 phrases with 247 unique words, to cover a test set of spontaneous utterances, such as 9644 spontaneous utterances, collected by users, such as each of the 9644 utterances contains at least one of the phrases. Examples of this set of 398 phrases contain (but are not limited to) anaerobic, average power, average pulse, bike computer, biking speed, cancel my workout, etc.

In order to detect the various phrases from a spoken input uttered by a speaker, such as speaker 250 of FIG. 2, detection and listening logic 201 of FIG. 2 may be based on an embedded automatic speech recognition (ASR) engine, where the ASR engine used for the experiments supports Hidden Markov Models (HMMs) with long-short term memory networks (LSTM). Further, a decoder combines dynamic composition of Weighted Finite-State Transducers (WFSTs) together with language model compression for less memory usage and better memory locality.

For example, if a false reject rate, such as 10.1%, is detected on a test set of 9644 utterances, which have been recorded in various noisy conditions, then this false reject rate of 10.1% reflects an event for around 970 utterances has not be triggered. Further, any false alarm rate is measured on a separate data set of 85 hours of various speech and music recordings such that the system triggers approximately once every 2 minutes on this data set, such as analysis logic 203 of FIG. 2 runs on the history buffer every 2 minutes.

In one embodiment, analysis logic 203 of FIG. 2 may run on a processor, such as application processor 112, in high-power state. Now, if sentences in the set are rather short (e.g., 6 words on average), then about 5 seconds of speech stored in the history buffer may be regarded as sufficient for deeper analysis. In some embodiments, analysis logic 203 of FIG. 2 may run at 10 times the real-time speed on a platform that consumes around 7.5 Watts when active. Under these assumptions, for example, analysis logic 203 of FIG. 2 may consume around ((7.5 Watts*5 seconds)/10)/120 seconds=31 mW in addition to the power consumed by detection and listening logic 201 of FIG. 2, which runs in low power on the DSP and workable even on smaller device, such as wearable devices.

It is contemplated and to be noted that embodiments are not limited to this use case scenario 350 or any particular implementation, where this use case scenario is according to one embodiment and for brevity, clarify, and ease of understanding.

Figure 4:
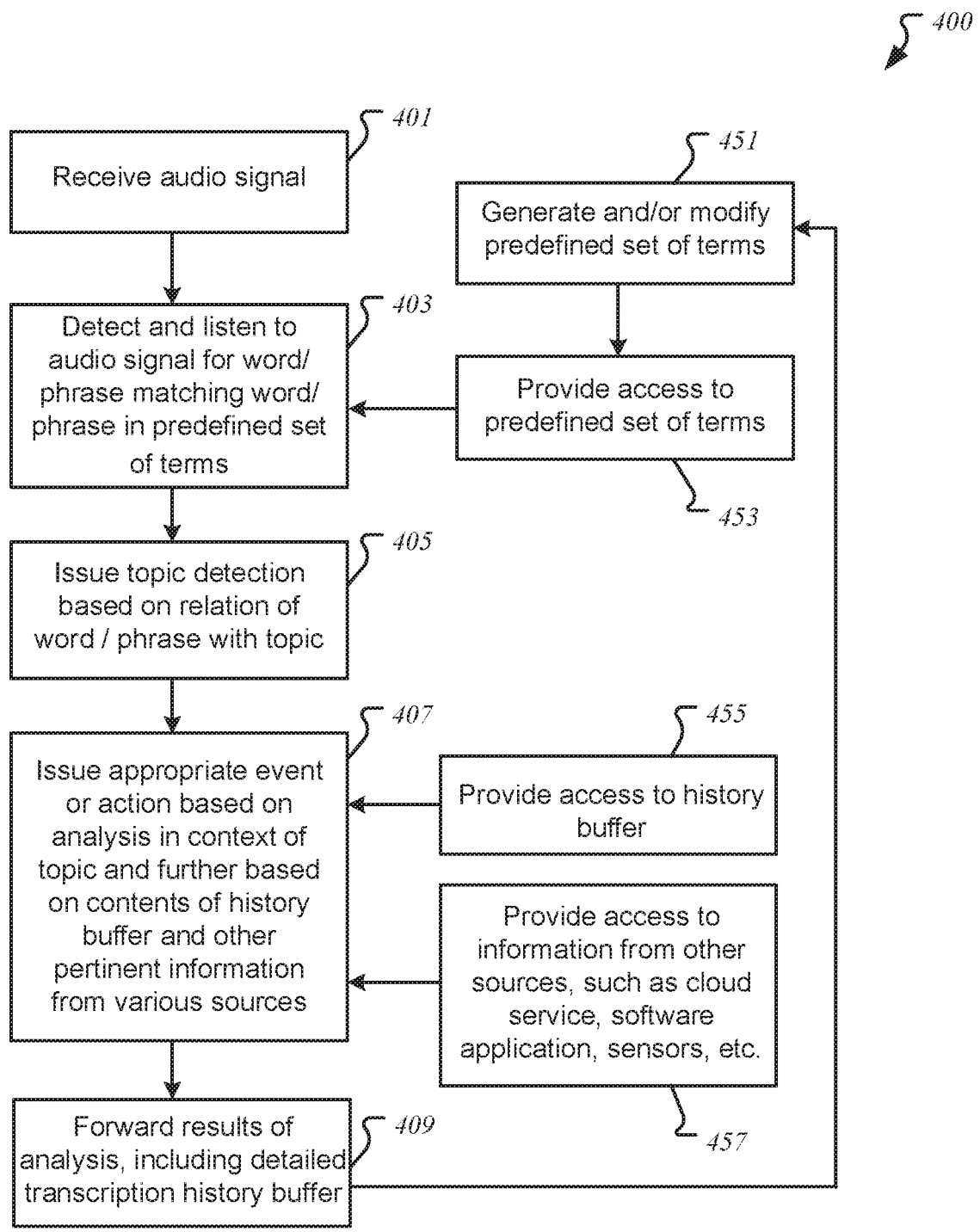
FIG. 4 illustrates a method for facilitating continuous topic detection and adaption in audio environments according to one embodiment.

FIG. 4 illustrates a method 400 for continuous topic detection and adaptation in audio environments according to one embodiment. For the sake of brevity, many of the details previously mentioned or discussed with reference to FIGS. 1-3B may not be discussed or repeated hereafter. Further, it is contemplated that any processes or transactions with this and other illustrations may be performed by processing logic that may comprise hardware (e.g., circuitry, dedicated logic, programmable logic, etc.), software (such as instructions run on a processing device), or a combination thereof, as facilitated by topic mechanism 110 and/or one or more of topic components 120, 130 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

Method 400 begins at block 401 by receiving an audio signal from a speaker through one or more microphones of a voice-enabled device. At block 403, the audio signal is detected and listened to for any words or phrases that are part of a set of predefined set of terms received from block 453, which is generated earlier at block 451. If a word/phrase matches a word/phrase from the predetermined set of terms, then topic detection is issued at block 405. At block 407, this topic detection is used to further analyze the word/phrase in the context of a relevant topic and according, an appropriate event or action is triggered. This analysis is further based on any contents received from history buffer 455 and any other information 457 received from one or more sources, such as a cloud service, software applications, sensors, etc. At block 409, the results of the analysis, including any detailed transcription history buffer, are forwarded on to block 451, where these results are then used to generate and/or modify the predefined set of terms.

Figure 5:
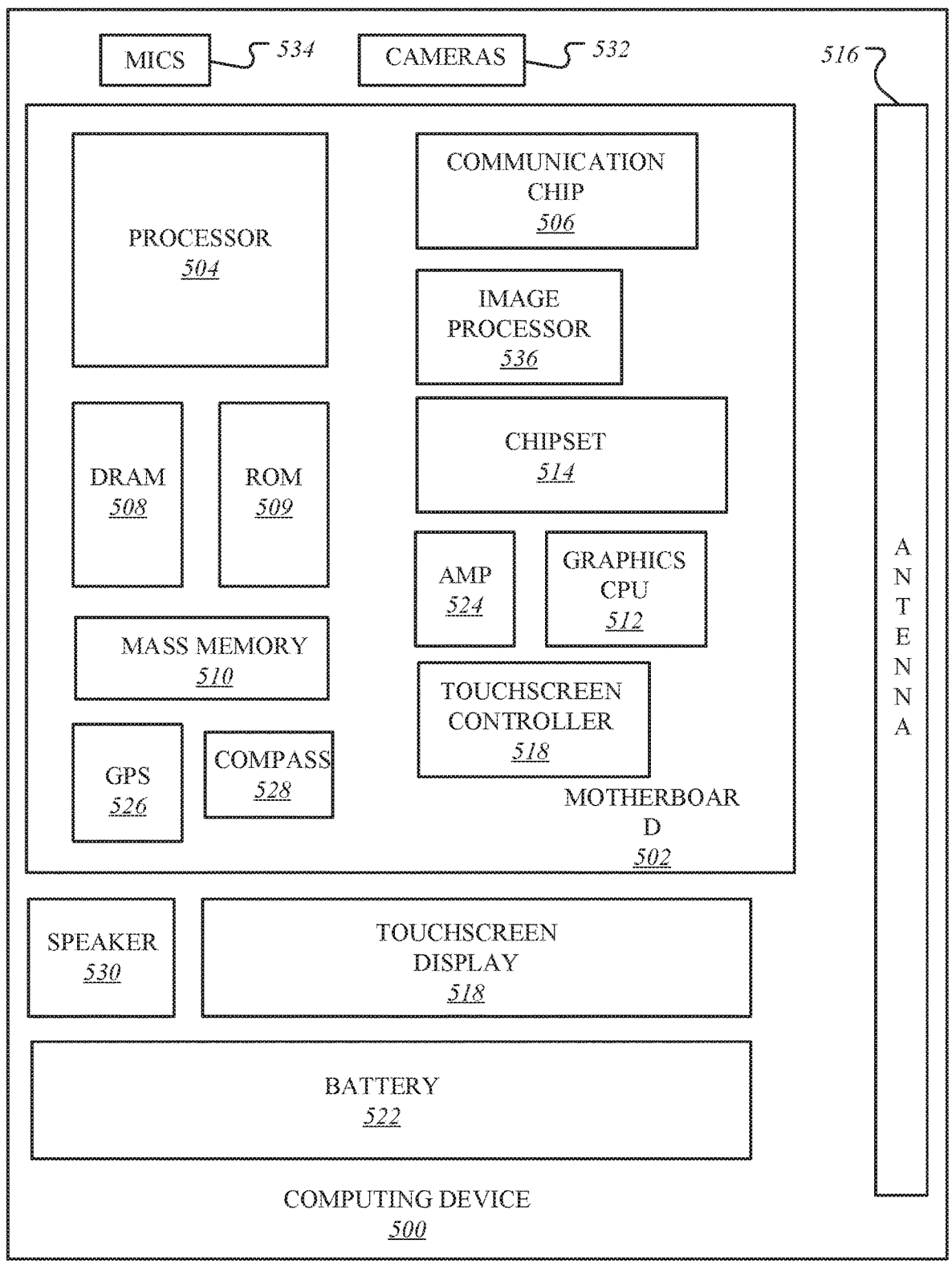
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
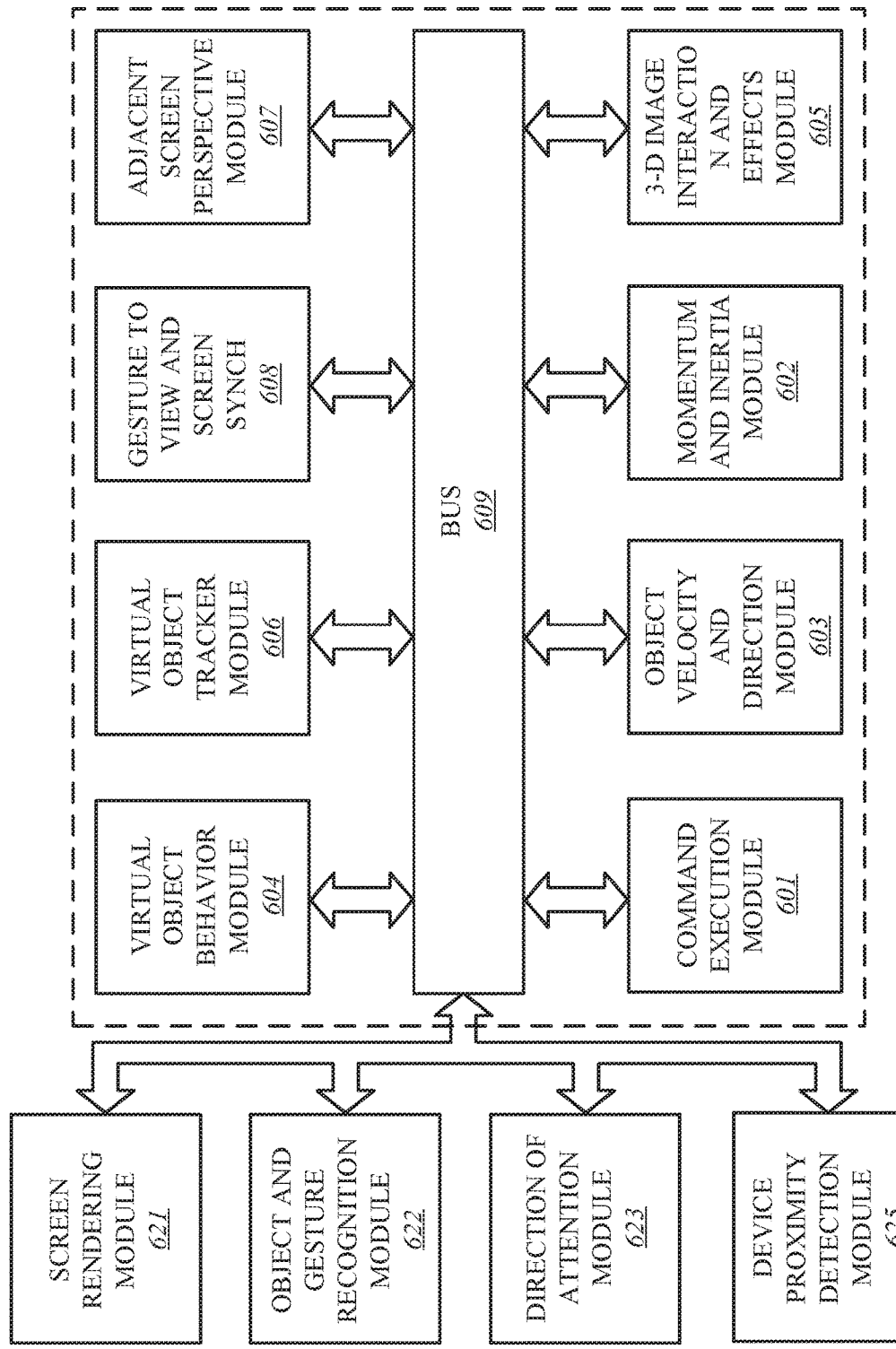
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate topic detection and adaption in audio environments, the apparatus comprising: one or more processors to: detect a term relating to a topic in an audio input received from one or more microphones of the computing device including a voice-enabled device; analyze the term based on the topic to determine an action to be performed by the computing device; and trigger an event to facilitate the computing device to perform the action consistent with the term and the topic.

Example 2 includes the subject matter of Example 1, wherein the term comprises one or more of a word, a phrase, a sentence associated with the topic, wherein the term is detected based on a predetermined set of terms, wherein the term is captured by the one or more microphones when spoken by a user.

Example 3 includes the subject matter of Examples 1-2, wherein the one or more processors to wake up the computing device or switching the computing from a low-power mode to a high-power mode in response to the term matching one or more terms of the predetermined set of terms.

Example 4 includes the subject matter of Examples 1-3, wherein the computing device is awakened or switched from the low-power mode to the high-power mode in response to the term without having the user to remember or speak a specific key phrase, wherein the action includes facilitating the computing device provide knowledge or instructions to the user based on the topic associated with the term.

Example 5 includes the subject matter of Examples 1-4, wherein the one or more processors to generate the predetermined set of terms based on one or more of contents of a history buffer, metadata, and information obtained from one or more of one or more service providers, one or more software applications, and one or more sensors.

Example 6 includes the subject matter of Examples 1-5, wherein analyzing is further based on the contents of the history buffer maintained at a database coupled to the computing device.

Example 7 includes the subject matter of Examples 1-6, wherein the computing device comprises one or more processors comprising one or more of a graphics processor and an application processor, wherein the one or more processors are co-located on a common semiconductor package.

Some embodiments pertain to Example 8 that includes a method facilitating topic detection and adaption in audio environments, the method comprising: detecting a term relating to a topic in an audio input received from one or more microphones of the computing device including a voice-enabled device; analyzing the term based on the topic to determine an action to be performed by the computing device; and triggering an event to facilitate the computing device to perform the action consistent with the term and the topic.

Example 9 includes the subject matter of Example 8, wherein the term comprises one or more of a word, a phrase, a sentence associated with the topic, wherein the term is detected based on a predetermined set of terms, wherein the term is captured by the one or more microphones when spoken by a user.

Example 10 includes the subject matter of Examples 8-9, further comprising waking up the computing device or switching the computing from a low-power mode to a high-power mode in response to the term matching one or more terms of the predetermined set of terms.

Example 11 includes the subject matter of Examples 8-10, wherein the computing device is awakened or switched from the low-power mode to the high-power mode in response to the term without having the user to remember or speak a specific key phrase, wherein the action includes facilitating the computing device provide knowledge or instructions to the user based on the topic associated with the term.

Example 12 includes the subject matter of Examples 8-11, further comprising generating the predetermined set of terms based on one or more of contents of a history buffer, metadata, and information obtained from one or more of one or more service providers, one or more software applications, and one or more sensors.

Example 13 includes the subject matter of Examples 8-12, wherein analyzing is further based on the contents of the history buffer maintained at a database coupled to the computing device.

Example 14 includes the subject matter of Examples 8-13, wherein the computing device comprises one or more processors comprising one or more of a graphics processor and an application processor, wherein the one or more processors are co-located on a common semiconductor package.

Some embodiments pertain to Example 15 that includes a data processing system comprising one or more processors to: detect a term relating to a topic in an audio input received from one or more microphones of a computing device including a voice-enabled device; analyze the term based on the topic to determine an action to be performed by the computing device; and trigger an event to facilitate the computing device to perform the action consistent with the term and the topic; and a memory coupled to the one or more processors.

Example 16 includes the subject matter of Example 15, wherein the term comprises one or more of a word, a phrase, a sentence associated with the topic, wherein the term is detected based on a predetermined set of terms, wherein the term is captured by the one or more microphones when spoken by a user.

Example 17 includes the subject matter of Examples 15-16, wherein the one or more processors to wake up the computing device or switching the computing from a low-power mode to a high-power mode in response to the term matching one or more terms of the predetermined set of terms.

Example 18 includes the subject matter of Examples 15-17, wherein the computing device is awakened or switched from the low-power mode to the high-power mode in response to the term without having the user to remember or speak a specific key phrase, wherein the action includes facilitating the computing device provide knowledge or instructions to the user based on the topic associated with the term.

Example 19 includes the subject matter of Examples 15-18, wherein the one or more processors to generate the predetermined set of terms based on one or more of contents of a history buffer, metadata, and information obtained from one or more of one or more service providers, one or more software applications, and one or more sensors.

Example 20 includes the subject matter of Examples 15-19, wherein analyzing is further based on the contents of the history buffer maintained at a database coupled to the computing device.

Example 21 includes the subject matter of Examples 15-20, wherein the computing device comprises one or more processors comprising one or more of a graphics processor and an application processor, wherein the one or more processors are co-located on a common semiconductor package.

Some embodiments pertain to Example 22 that includes an apparatus facilitating embedding of human labeler influences in machine learning interfaces in computing environments, the apparatus comprising: means for detecting a term relating to a topic in an audio input received from one or more microphones of a computing device including a voice-enabled device; analyzing the term based on the topic to determine an action to be performed by the computing device; and triggering an event to facilitate the computing device to perform the action consistent with the term and the topic; and a memory coupled to the one or more processors.

Example 23 includes the subject matter of Example 22, wherein the term comprises one or more of a word, a phrase, a sentence associated with the topic, wherein the term is detected based on a predetermined set of terms, wherein the term is captured by the one or more microphones when spoken by a user.

Example 24 includes the subject matter of Examples 22-23, wherein the computing device to wake up the computing device or switching the computing from a low-power mode to a high-power mode in response to the term matching one or more terms of the predetermined set of terms.

Example 25 includes the subject matter of Examples 22-24, wherein the computing device is awakened or switched from the low-power mode to the high-power mode in response to the term without having the user to remember or speak a specific key phrase, wherein the action includes facilitating the computing device provide knowledge or instructions to the user based on the topic associated with the term.

Example 26 includes the subject matter of Examples 22-25, further comprising means for generating the predetermined set of terms based on one or more of contents of a history buffer, metadata, and information obtained from one or more of one or more service providers, one or more software applications, and one or more sensors.

Example 27 includes the subject matter of Examples 22-26, wherein the means for analyzing is further based on the contents of the history buffer maintained at a database coupled to the computing device.

Example 28 includes the subject matter of Examples 22-27, wherein the computing device comprises one or more processors comprising one or more of a graphics processor and an application processor, wherein the one or more processors are co-located on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. At least one non-transitory computer-readable medium comprising instructions which, when executed by a computing device, cause the computing device to perform operations comprising:
   detecting one or more arbitrary terms relating to a topic in an audio input received from one or more microphones of the computing device including a voice-enabled device, wherein the computing device is continuously awakened or switched from hibernating from a low-power mode to a high-power mode or vice versa based on the one or more arbitrary terms;
   analyzing the one or more terms based on historical information relating to the topic to determine an action to be performed by the computing device, wherein the one or more arbitrary terms include one or more random conversational words that are independent of pre-determined keywords, and wherein the historical information relating to the topic is instantly searched or collected over a period of time; and
   triggering an event to facilitate the computing device to perform the action consistent with the one or more arbitrary terms and the historical information relating to the topic.

2. The non-transitory computer-readable medium of claim 1, wherein the one or more arbitrary terms further comprise one or more random conversational phrase, or one or more random conversational sentences.

3. The non-transitory computer-readable medium of claim 1, wherein the computing device is awakened or switched from the low-power mode to the high-power mode in response to the one or more arbitrary terms without having a user to speak the one or more arbitrary terms, wherein the action includes facilitating the computing device to provide knowledge or instructions to the user based on the topic.

4. The non-transitory computer-readable medium of claim 1, wherein the history information or metadata relating to the topic are maintained and accessible at a database coupled to the computing device.

5. The non-transitory computer-readable medium of claim 1, wherein the computing device comprises one or more processors comprising one or more of a graphics processor and an application processor, wherein the one or more processors are co-located on a common semiconductor package.

6. A method comprising:
    detecting one or more arbitrary terms relating to a topic in an audio input received from one or more microphones of the computing device including a voice-enabled device, wherein the computing device is continuously awakened or switched from hibernating from a low-power mode to a high-power mode or vice versa based on the one or more arbitrary terms;
    analyzing the one or more terms based on historical information relating to the topic to determine an action to be performed by the computing device, wherein the one or more arbitrary terms include one or more random conversational words that are independent of pre-determined keywords, and wherein the historical information relating to the topic is instantly searched or collected over a period of time; and
    triggering an event to facilitate the computing device to perform the action consistent with the one or more arbitrary terms and the historical information relating to the topic.

7. The method of claim 6, wherein the one or more arbitrary terms further comprise one or more random conversational phrase, or one or more random conversational sentences.

8. The method of claim 6, wherein the computing device is awakened or switched from the low-power mode to the high-power mode in response to the one or more arbitrary terms without having a user to speak the one or more arbitrary terms, wherein the action includes facilitating the computing device to provide knowledge or instructions to the user based on the topic.

9. The method of claim 6, wherein the history information or metadata relating to the topic are maintained and accessible at a database coupled to the computing device, wherein the computing device comprises one or more processors comprising one or more of a graphics processor and an application processor, wherein the one or more processors are co-located on a common semiconductor package.

10. An apparatus comprising:
    one or more processors to:
    detect one or more arbitrary terms relating to a topic in an audio input received from one or more microphones of the computing device including a voice-enabled device, wherein the computing device is continuously awakened or switched from hibernating from a low-power mode to a high-power mode or vice versa based on the one or more arbitrary terms;
    analyze the one or more terms based on the topic to determine an action to be performed by the computing device, wherein the one or more arbitrary terms include one or more random conversational words that are independent of pre-determined keywords, and wherein the historical information relating to the topic is instantly searched or collected over a period of time; and
    trigger an event to facilitate the computing device to perform the action consistent with the one or more arbitrary terms and the historical information relating to the topic.

11. The apparatus of claim 10, wherein the one or more arbitrary terms further comprise one or more random conversational phrase, or one or more random conversational sentences.

12. The apparatus of claim 10, wherein the computing device is awakened or switched from the low-power mode to the high-power mode in response to the one or more arbitrary terms without having a user to speak the one or more arbitrary terms, wherein the action includes facilitating the computing device to provide knowledge or instructions to the user based on the topic.

13. The apparatus of claim 10, wherein the history information or metadata relating to the topic are maintained and accessible at a database coupled to the computing device.

14. The apparatus of claim 10, wherein the computing device comprises one or more processors comprising one or more of a graphics processor and an application processor, wherein the one or more processors are co-located on a common semiconductor package.

* * * * *